(12) United States Patent
Yoon et al.

(10) Patent No.: US 10,770,711 B2
(45) Date of Patent: Sep. 8, 2020

(54) CAP ASSEMBLY FOR CYLINDRICAL SECONDARY BATTERY COMPRISING CURRENT INTERRUPT DEVICE COATED WITH INSULATING MATERIAL ON OUTER CIRCUMFERENCE SURFACE

(71) Applicant: LG CHEM, LTD., Seoul-si (KR)

(72) Inventors: U Jin Yoon, Daejeon (KR); Kwan Hee Lee, Daejeon (KR); Duk Hyun Ryu, Daejeon (KR); Seung Won Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 267 days.

(21) Appl. No.: 15/861,120

(22) Filed: Jan. 3, 2018

(65) Prior Publication Data

US 2018/0198108 A1 Jul. 12, 2018

(30) Foreign Application Priority Data

Jan. 6, 2017 (KR) ........................ 10-2017-0002343

(51) Int. Cl.
| | |
|---|---|
| *H01M 2/12* | (2006.01) |
| *H01M 2/30* | (2006.01) |
| *H01M 10/04* | (2006.01) |
| *H01M 10/0587* | (2010.01) |
| *H01M 2/34* | (2006.01) |
| *H01M 2/04* | (2006.01) |
| *H01M 10/0525* | (2010.01) |
| *H01M 10/052* | (2010.01) |

(52) U.S. Cl.
CPC ............ *H01M 2/345* (2013.01); *H01M 2/04* (2013.01); *H01M 2/046* (2013.01); *H01M 2/0413* (2013.01); *H01M 2/0482* (2013.01); *H01M 2/1241* (2013.01); *H01M 2/30* (2013.01); *H01M 10/0422* (2013.01); *H01M 10/052* (2013.01); *H01M 10/0525* (2013.01); *H01M 10/0587* (2013.01); *H01M 2200/20* (2013.01)

(58) Field of Classification Search
CPC .. H01M 2/345; H01M 10/052; H01M 2/0482; H01M 2/0413; H01M 2/046; H01M 2/04; H01M 2/1241; H01M 10/0525; H01M 10/0422; H01M 10/0587; H01M 2/30; H01M 2200/20
See application file for complete search history.

(56) References Cited

U.S. PATENT DOCUMENTS

| | | | | |
|---|---|---|---|---|
| 5,570,501 | A * | 11/1996 | Atkinson | F16J 15/122 156/219 |
| 8,980,463 | B2 | 3/2015 | Kim et al. | |
| 9,153,802 | B2 | 10/2015 | Andersen et al. | |
| 9,153,805 | B2 | 10/2015 | Lee et al. | |
| 2009/0250242 | A1 * | 10/2009 | Goto | H01B 11/12 174/113 R |
| 2010/0187771 | A1 * | 7/2010 | Waltenberg | F01N 13/1827 277/595 |
| 2012/0282504 | A1 * | 11/2012 | Kim | H01M 2/0426 429/82 |
| 2013/0015076 | A1 * | 1/2013 | Yoshida | C25B 1/02 205/340 |
| 2013/0068519 | A1 * | 3/2013 | Bunyan | H05K 9/0015 174/358 |
| 2015/0099163 | A1 * | 4/2015 | Kim | H01M 2/0473 429/178 |

FOREIGN PATENT DOCUMENTS

| | | |
|---|---|---|
| KR | 10-2000-0042977 A | 7/2000 |
| KR | 10-2011-0105953 A | 9/2011 |
| KR | 10-2013-0009691 A | 1/2013 |
| KR | 10-2016-0039804 A | 4/2016 |

* cited by examiner

*Primary Examiner* — Muhammad S Siddiquee
(74) *Attorney, Agent, or Firm* — Morgan, Lewis & Bockius LLP

(57) ABSTRACT

Disclosed herein is a cap assembly loaded on an open upper end of a metal battery can of a cylindrical secondary battery. The cap assembly includes a top cap located at the uppermost end of the cap assembly, a safety vent located under the top cap and electrically connected to the top cap via a safety vent for discharging gas, a current interrupt device configured such that a portion of the upper surface of the current interrupt device is connected to the safety vent and a portion of the lower surface of the current interrupt device is connected to an electrode lead of an electrode assembly, and a current interrupt device (CID) gasket coupled to the current interrupt device so as to wrap an outer circumferential part of the current interrupt device in order to secure the electrical insulation property of the current interrupt device.

17 Claims, 14 Drawing Sheets

[FIG. 1]
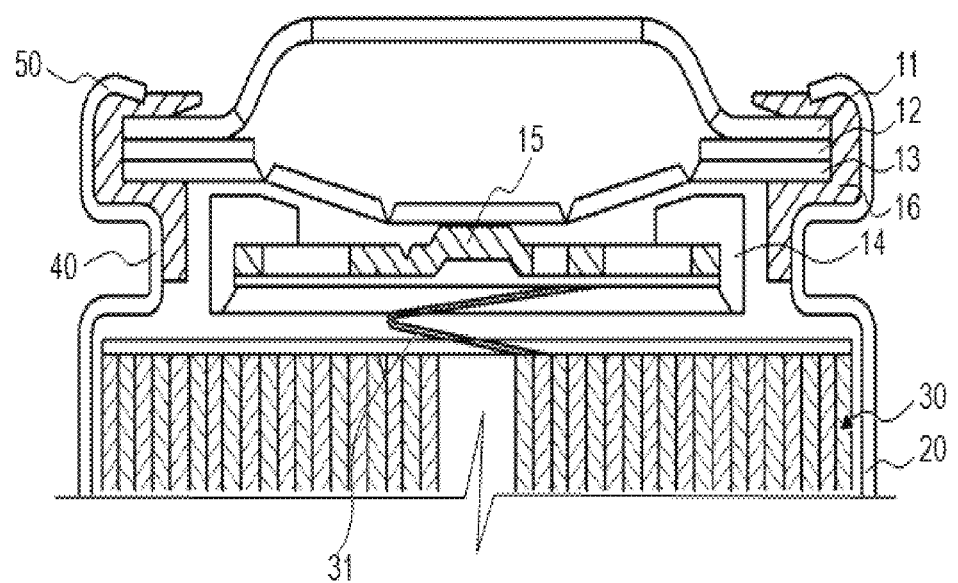

[FIG. 2]
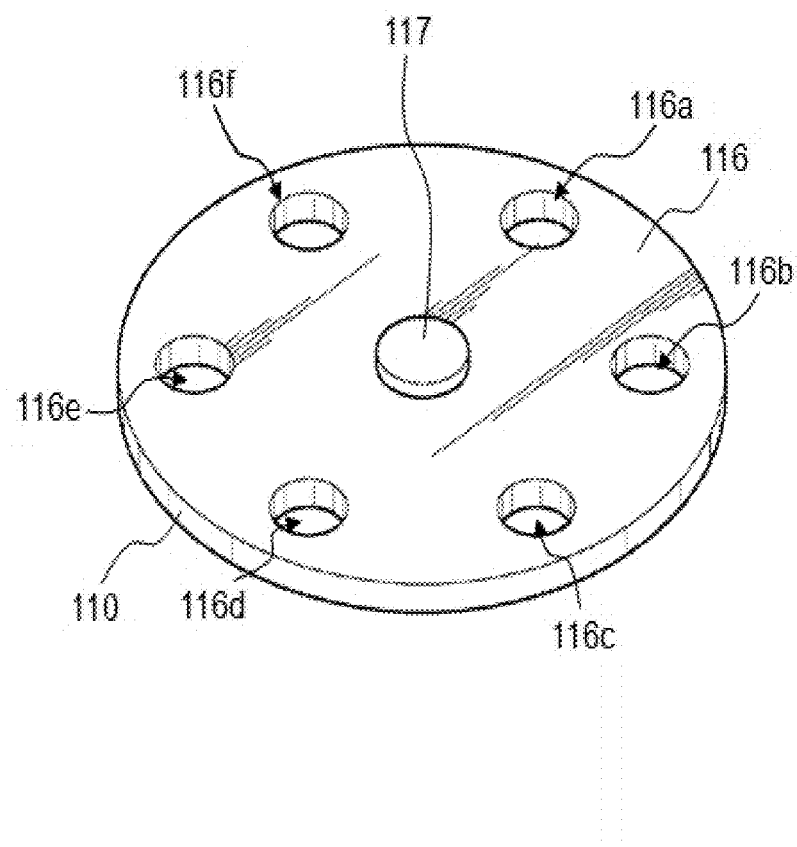

[FIG. 3]
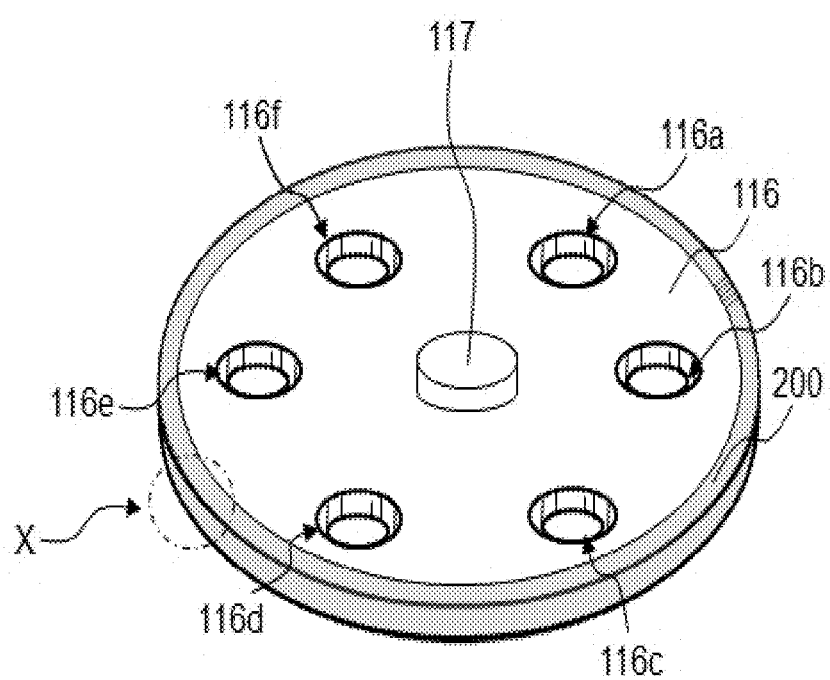

[FIG. 4]
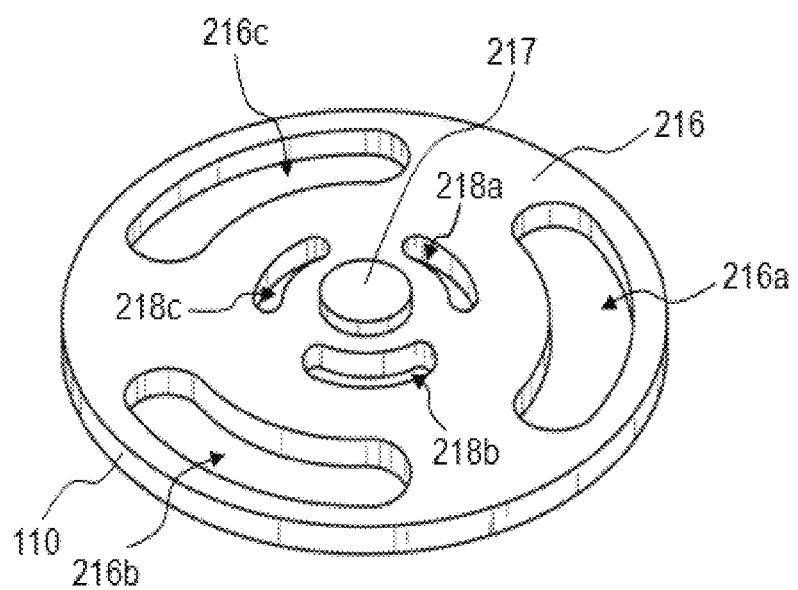

[FIG. 5]
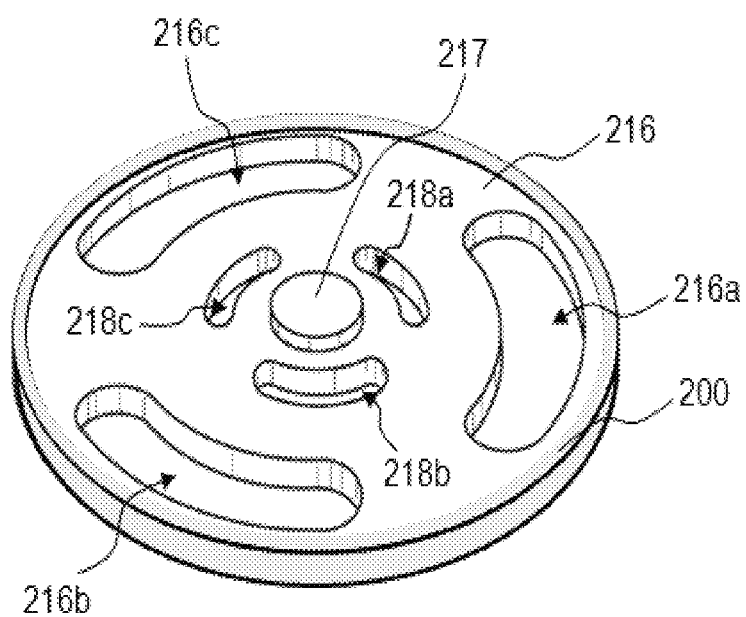

[FIG. 6]
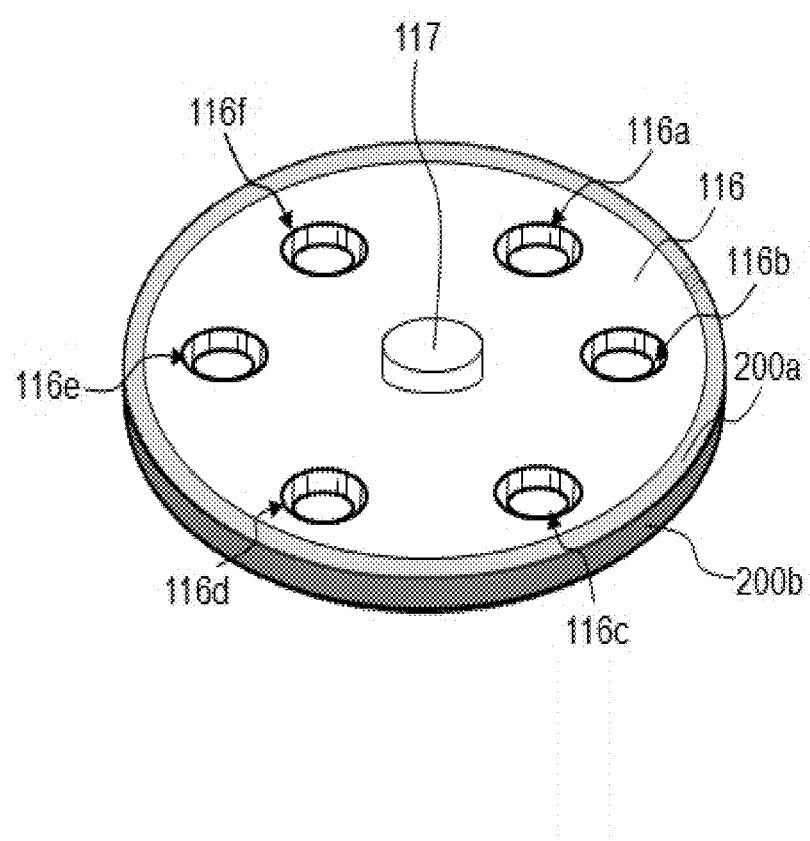

[FIG. 7]
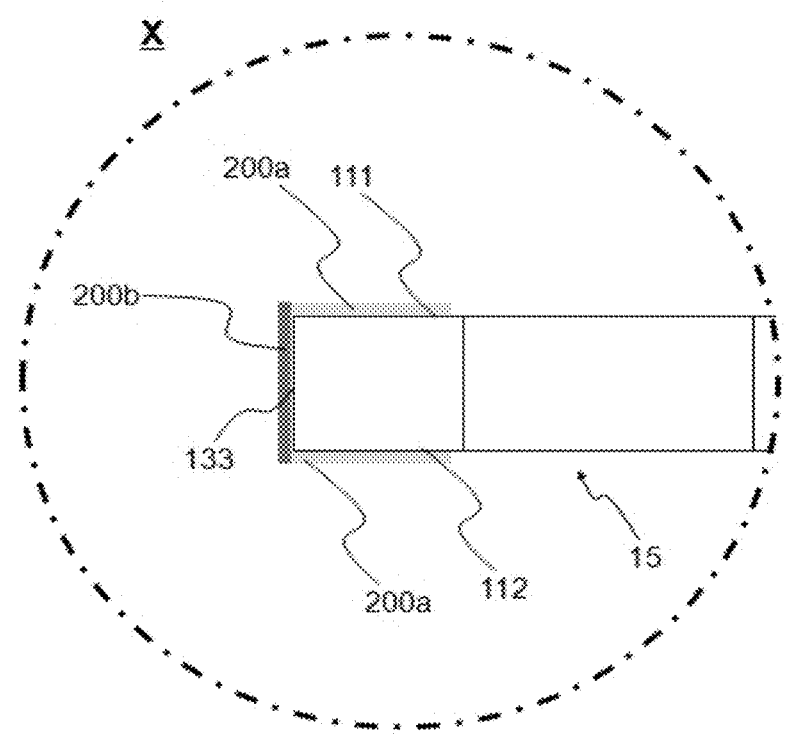

[FIG. 8]
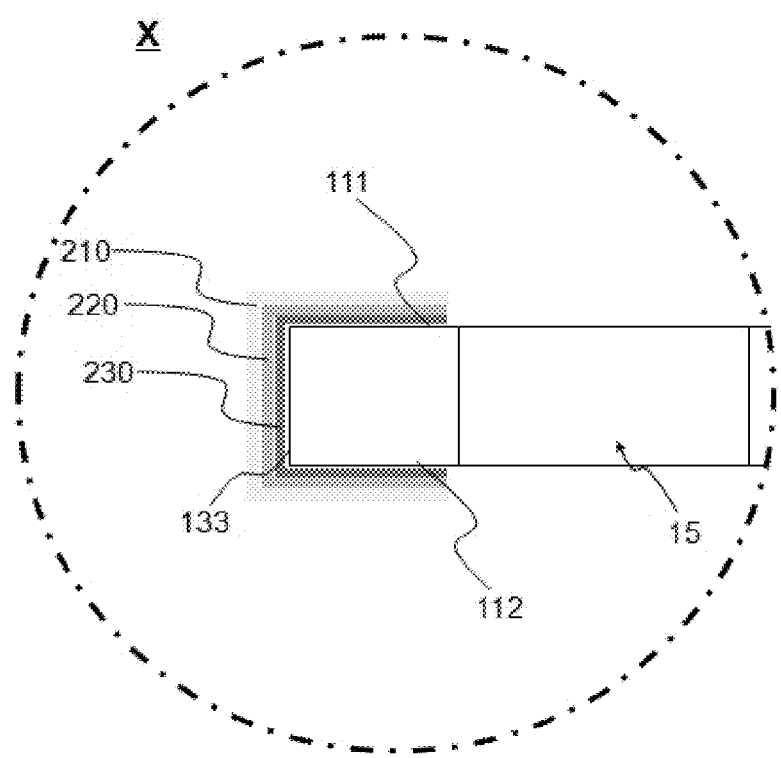

[FIG. 9]
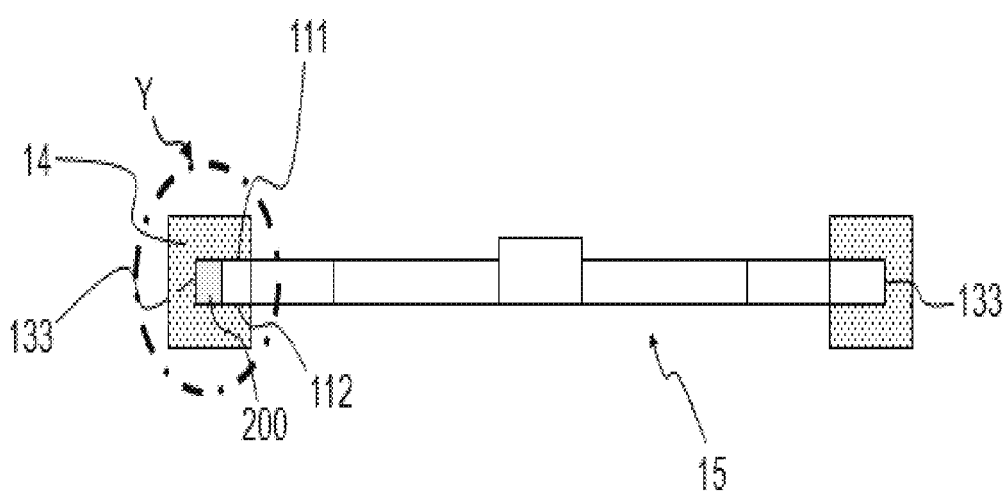

[FIG. 10]
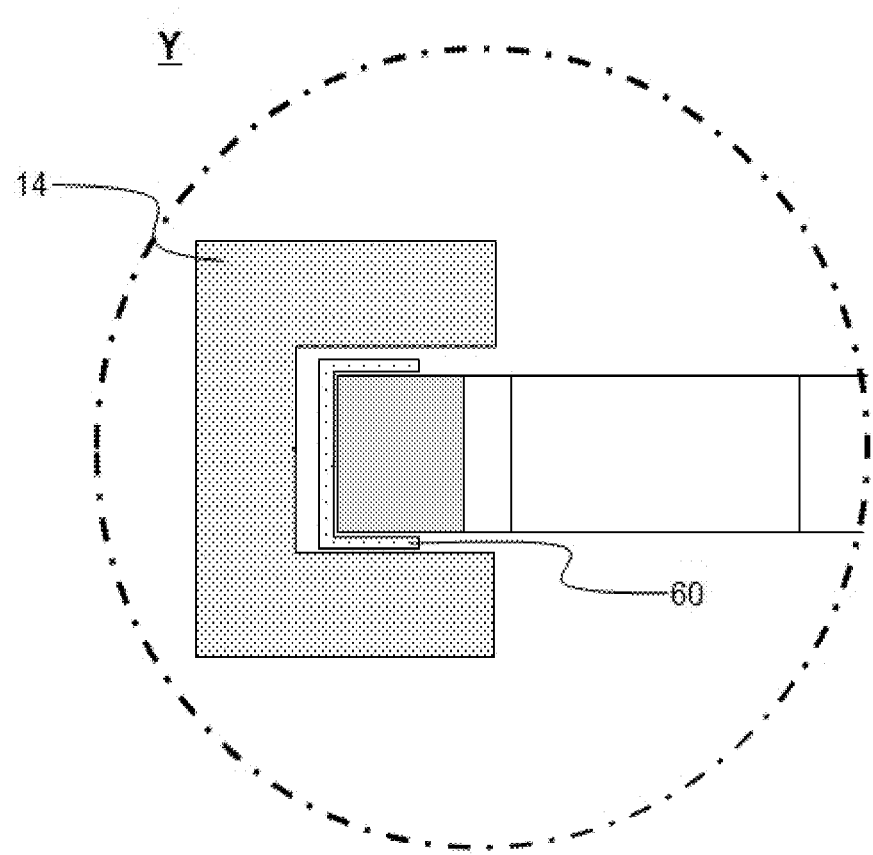

[FIG. 11]
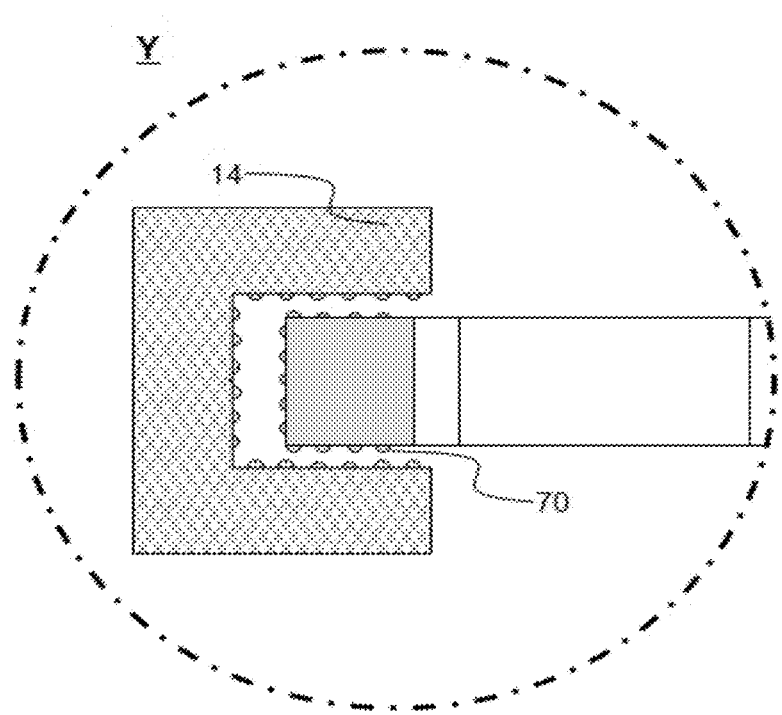

[FIG. 12]
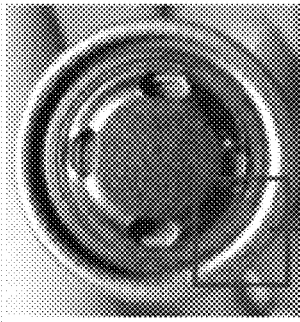

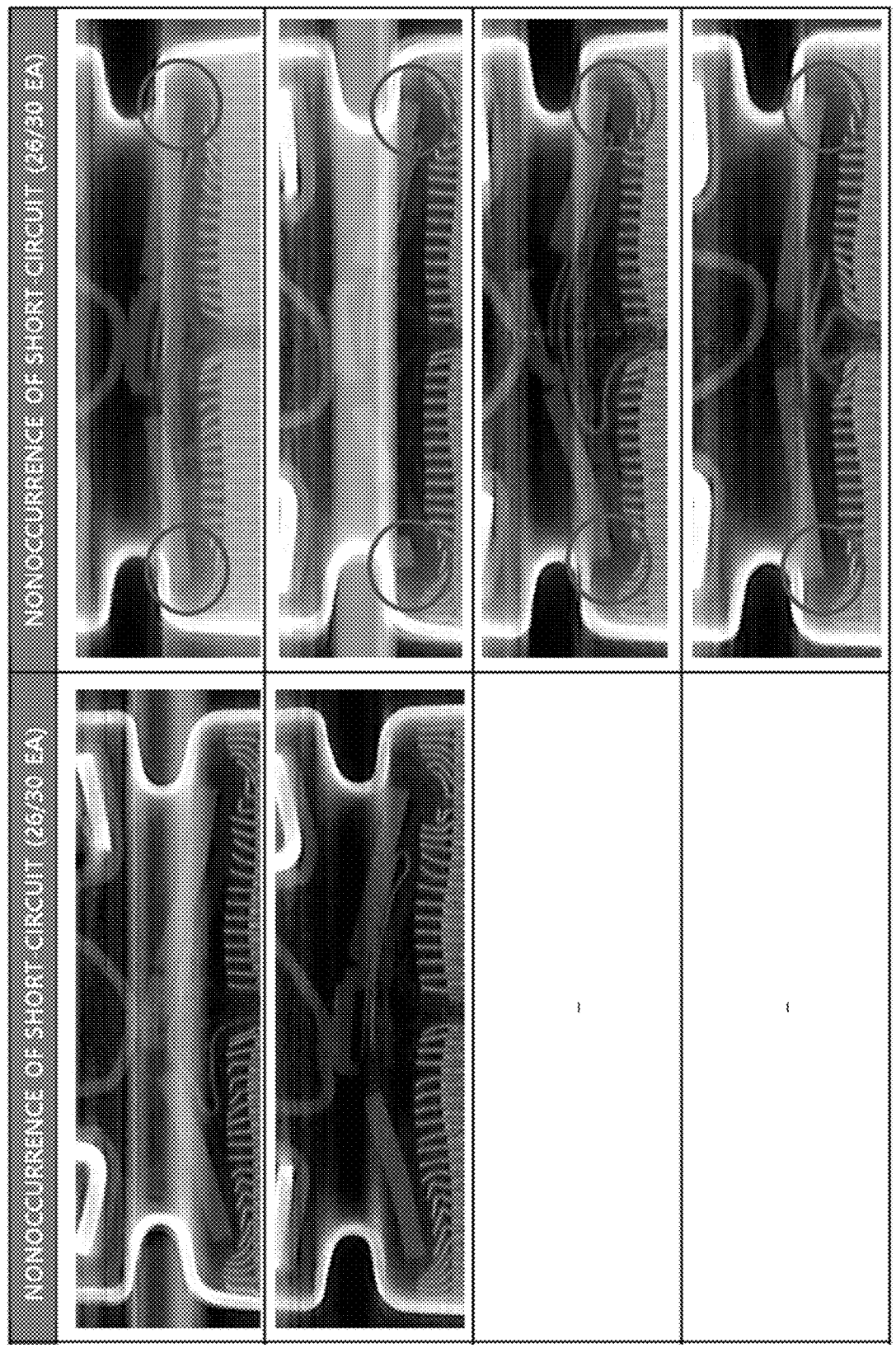
[FIG. 13]

[FIG. 14]
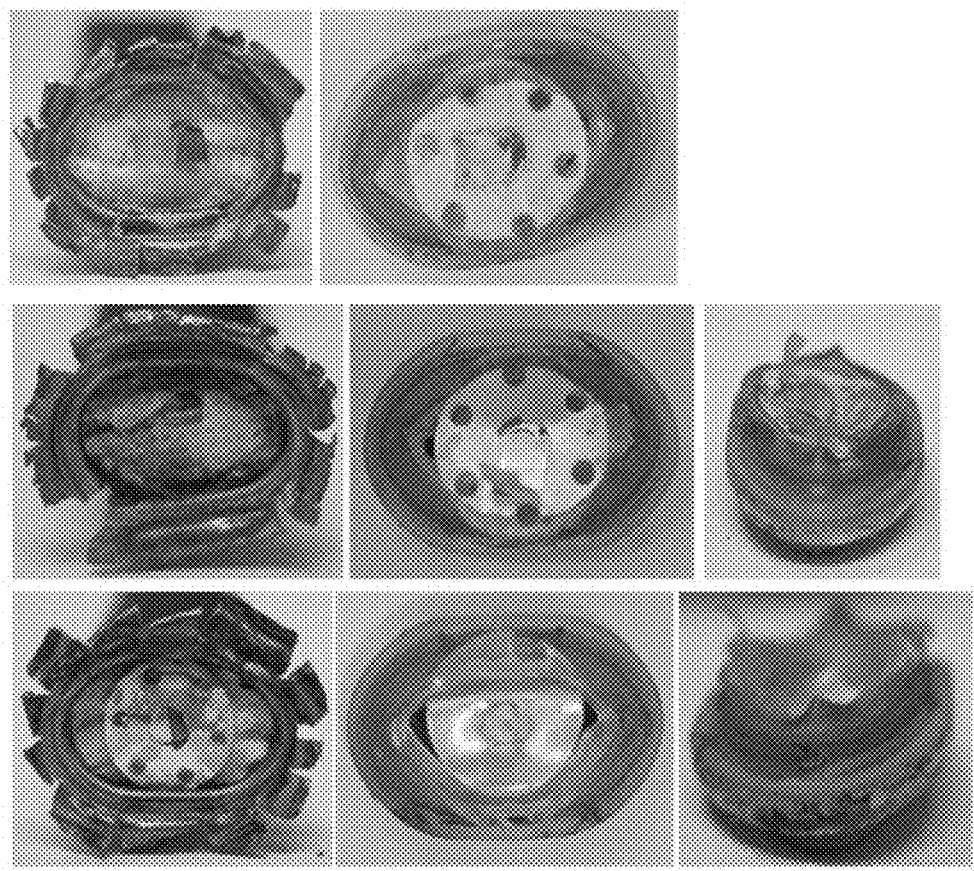

CAP ASSEMBLY FOR CYLINDRICAL SECONDARY BATTERY COMPRISING CURRENT INTERRUPT DEVICE COATED WITH INSULATING MATERIAL ON OUTER CIRCUMFERENCE SURFACE

TECHNICAL FIELD

The present invention relates to a cap assembly for cylindrical secondary batteries including a current interrupt device having an insulating material coated on an outer circumferential part thereof.

BACKGROUND ART

As energy prices are increasing due to the depletion of fossil fuels and increasing attention is being paid to environmental pollution, the demand for environmentally friendly alternative energy sources is bound to play an increasing role in the future. Thus, research into techniques for generating various kinds of power, such as nuclear energy, solar energy, wind energy, and tidal power, is underway, and power storage apparatuses for more efficient use of the generated energy are also drawing much attention.

In particular, the demand for secondary batteries as energy sources is rapidly increasing as mobile device technology continues to develop and the demand for such mobile devices continues to increase. Accordingly, much research on batteries satisfying various needs has been carried out.

In general, a secondary battery is a battery that can be charged and discharged, unlike a primary battery, which is not chargeable. The secondary battery is widely used in electronic devices, such as mobile phones, camcorders, and laptop computers, or electric vehicles. In particular, a lithium secondary battery has a capacity three or more times larger than the capacity of a nickel cadmium battery or a nickel hydride battery, which is widely used as a power source for electronic devices, and exhibits high energy density per unit weight. For these reasons, the lithium secondary battery has been increasingly used.

Based on the shape of the battery case of a secondary battery, the secondary battery may be classified as a cylindrical battery configured to have a structure in which an electrode assembly is mounted in a cylindrical metal battery can, a prismatic battery configured to have a structure in which an electrode assembly is mounted in a prismatic metal battery can, or a pouch-shaped battery configured to have a structure in which an electrode assembly is mounted in a pouch-shaped battery case made of an aluminum laminate sheet.

A cylindrical secondary battery generally includes a cylindrical battery can, an electrode assembly mounted in the cylindrical battery can, and a cap assembly coupled to the upper part of the cylindrical battery can. The cap assembly is located at an opening formed in the upper part of the cylindrical battery can. The cap assembly includes a top cap and a safety vent.

FIG. 1 is a vertical sectional view showing a cap assembly of a conventional cylindrical secondary battery.

Referring to FIG. 1, the conventional cylindrical secondary battery includes a cylindrical battery can 20, a jelly-roll type electrode assembly 30 mounted in the battery can 20, a cap assembly 10 coupled to the upper part of the battery can 20, a beading part 40 provided at the upper end of the battery can 20 for allowing the cap assembly 10 to be loaded on the upper part of the battery can 20, and a crimping part 50 for sealing the battery.

The electrode assembly 30 is configured to have a structure in which a positive electrode and a negative electrode are wound in the form of a jelly roll in the state in which a separator is interposed between the positive electrode and the negative electrode. A positive electrode lead 31, which is attached to the positive electrode, is connected to the cap assembly 10, and a negative electrode lead (not shown), which is attached to the negative electrode, is connected to the lower end of the battery can 20.

The cap assembly 10 is configured to have a structure in which a top cap 11, which constitutes a positive electrode terminal, a safety element 12 for interrupting the flow of current by increasing battery resistance when the temperature in the battery increases, such as a positive temperature coefficient (PTC) element, a safety vent 13 for interrupting the flow of current and/or discharging gas to the outside when the pressure in the battery increases, a current interrupt device (CID) gasket 14 for electrically separating the safety vent 13 from a current interrupt device 15 excluding a specific region of the secondary battery, and the current interrupt device 15 connected to the positive electrode lead 31, which is attached to the positive electrode, are sequentially stacked. The cap assembly 10 having the above-described structure is mounted to the beading part 40 of the battery can 20 in the state in which a sealing gasket 16 is interposed therebetween.

Under normal operating conditions, therefore, the positive electrode of the electrode assembly 30 is connected to the top cap 11 via the positive electrode lead 31, the current interrupt device 15, the safety vent 13, and the safety element 12, whereby the secondary battery is in an electrically conductive state.

When gas is generated in the battery can 20 due to overcharge, etc. and thus the pressure in the battery can 20 increases, however, the safety vent 13 protrudes upward while being deformed. As a result, the safety vent 13 is separated from the current interrupt device 15, whereby the flow of current is interrupted.

Consequently, the charge and discharge of the secondary battery is no longer performed, whereby the safety of the secondary battery is secured. Furthermore, when the pressure in the secondary battery exceeds a predetermined level, the safety vent 13 ruptures, and the gas in the battery can is discharged to the outside through a gas hole (not shown) formed in the top cap 11 via the ruptured safety vent, whereby the explosion of the secondary battery is prevented.

In the above structure, the current interrupt device 15 is generally made of a metal material. When an external strong impact or pressure is applied to the secondary battery or when the pressure of the gas in the secondary battery increases, the CID gasket 14 is separated or detached from the current interrupt device 15 or the CID gasket ruptures. As a result, the current interrupt device 15 comes into contact with the battery can or the negative electrode, whereby a short circuit may occur in the secondary battery. In addition, when the current interrupt device 15 comes into contact with the safety vent 13, the current interrupt device 15 cannot interrupt the flow of current, whereby the secondary battery may explode, which drastically reduces the safety of the secondary battery.

Conventionally, the CID gasket 14 is made of an insulative material, such as polypropylene (PP) or polybutylene terephthalate (PBT) in order to prevent the occurrence of a short circuit in the secondary battery. When the secondary battery is deformed by external pressure, however, the CID gasket 14 is 14 is separated or detached from the current interrupt device 15 or the CID gasket ruptures, making it impossible to prevent the occurrence of a short circuit in the secondary battery.

Therefore, there is a strong necessity for technology that is capable of preventing a short circuit from occurring due to the current interrupt device 15, thereby improving the safety of the secondary battery.

DISCLOSURE

Technical Problem

Therefore, the present invention has been made to solve the above problems and other technical problems that have yet to be resolved.

As a result of a variety of extensive and intensive studies and experiments to solve the problems described above, the inventors of the present application have found that, in the case in which an insulative coating layer made of an electrically insulative material is formed on an outer circumferential part of a current interrupt device, it is possible to prevent the occurrence of a short circuit in a battery even when a current interrupt device (CID) gasket is separated or detached from the current interrupt device or the CID gasket ruptures and thus the current interrupt device comes into contact with a battery can or a negative electrode of the battery, whereby it is possible to improve the safety of the battery. The present invention has been completed based on these findings.

Technical Solution

In accordance with one aspect of the present invention, the above and other objects can be accomplished by the provision of a cap assembly loaded on an open upper end of a metal battery can of a cylindrical secondary battery, the cap assembly including a top cap located at the uppermost end of the cap assembly to constitute a positive electrode terminal having an outward protruding structure, a safety vent located under the top cap and electrically connected to the top cap via a safety vent for discharging gas, a current interrupt device configured such that a portion of the upper surface of the current interrupt device is connected to the safety vent and a portion of the lower surface of the current interrupt device is connected to an electrode lead of an electrode assembly, the portion of the current interrupt device connected to the safety vent being configured to rupture when high pressure is generated in the battery, whereby the current interrupt device is separated from the safety vent to interrupt the flow of current, and a current interrupt device (CID) gasket coupled to the current interrupt device so as to wrap an outer circumferential part of the current interrupt device excluding portions of the current interrupt device that are connected to electrode tabs and the safety vent in order to secure the electrical insulation property of the current interrupt device, wherein an insulative coating layer made of an electrically insulative material is formed on the outer circumferential part of the current interrupt device.

A conventional current interrupt device is electrically insulated by a CID gasket, which is fixed to an outer circumferential part thereof in the state of being in contact with the outer circumferential part thereof. In this structure, however, when an external strong impact or pressure is applied to the battery, the CID gasket is separated or detached from the current interrupt device, or the CID gasket ruptures. As a result, the current interrupt device comes into contact with the battery can or the negative electrode of the battery, whereby a short circuit may occur in the battery. In addition, the current interrupt device cannot interrupt the flow of current, whereby the battery may explode. Consequently, the safety of the cylindrical secondary battery is lowered.

In the present invention, an insulative coating layer made of an electrically insulative material is formed on the outer circumferential part of the current interrupt device in order to solve the above problems. Consequently, even when the CID gasket is separated or detached from the current interrupt device or the CID gasket ruptures and thus the current interrupt device comes into contact with the battery can or the negative electrode of the battery, it is possible to prevent the occurrence of a short circuit in the battery, thereby improving the safety of the battery.

In a concrete example, the current interrupt device may include a main body formed in the planar shape of a circle, the main body being provided therein with a plurality of openings, and a rupture part formed at the center of the main body so as to be ruptured by the increasing pressure of gas in the battery can, the rupture part being coupled to the lower end of the safety vent.

In this structure, gas generated in the battery can may be discharged to the outside through the openings. When the pressure of the gas in the battery can increases, the rupture part of the current interrupt device, which is connected to the safety vent, may rupture and/or may be separated from the main body of the current interrupt device in order to interrupt the flow of current, whereby the safety of the battery is secured.

The insulative coating layer according to the present invention may be continuously formed on the outer circumferential surface of the current interrupt device and on portions of the upper surface and the lower surface of the current interrupt device that are adjacent to the outer circumferential surface of the current interrupt device.

In other words, the current interrupt device and the CID gasket are coupled to each other in the state in which the insulative coating layer is coated on the outer circumferential part of the current interrupt device. When the pressure of the gas in the battery can increases, the central portion of the safety vent is deformed while moving upward, whereby the rupture part of the current interrupt device ruptures to thus interrupt the flow of current. Even when the CID gasket is separated or detached from the current interrupt device or the CID gasket ruptures and thus the current interrupt device comes into contact with the battery can, the insulated state of the current interrupt device is maintained by the insulative coating layer, whereby it is possible to prevent the occurrence of a short circuit in the battery.

In a concrete example, the insulative coating layer formed on the portions of the upper surface and the lower surface of the current interrupt device may have a width of 0.2 mm to 1 mm.

If the width of the insulative coating layer is less than 0.2 mm, it is not possible to effectively prevent the occurrence of a short circuit in the battery when the portions of the upper surface and the lower surface of the current interrupt device come into contact with the battery can, which is undesirable. On the other hand, if the width of the insulative coating layer is greater than 1 mm, the insulative coating layer may cover the openings formed in the main body of the current interrupt device. The openings are paths through which high-pressure gas in the battery is discharged to the outside. If the insulative coating layer is formed so as to cover the openings, the gas in the battery cannot be smoothly discharged to the outside, which is also undesirable.

The kind of the electrically insulative material is not particularly restricted. Since it is required for the electrically insulative material to exhibit a high insulation property, impact resistance, and elasticity, however, the electrically insulative material may be any one selected from the group consisting of polypropylene, polybutylene terephthalate (PBT), a polyacetate-based resin, a rubber resin, a nylon-based resin, a polylacton-based resin, chitosan, polyvinyl alcohol, fibrinogen, polysulfone, a polyurethane resin, a silicon-based resin, an acrylic-based resin, an epoxy-based resin, and an imide-based resin. In particular, the electrically insulative material may be a polyurethane resin.

In a concrete example, an insulative coating layer coated with a reinforced polyurethane resin may be formed on the outer circumferential surface of the current interrupt device. In another example, an insulative coating layer coated with a reinforced polyurethane resin may be formed on the outer circumferential surface of the current interrupt device, and an insulative coating layer coated with a silicon-based resin may be formed on portions of the upper surface and the lower surface of the current interrupt device that are adjacent to the outer circumferential surface of the current interrupt device.

Even when pressure or impact is applied to the battery in a direction that is parallel to the current interrupt device during the operation of the battery, therefore, the resistance of the CID gasket, which is in contact with the current interrupt device, to external pressure or impact may be supplemented by the reinforced polyurethane resin, since the outer circumferential surface of the current interrupt device is coated with the reinforced polyurethane resin. In addition, elasticity is realized between the current interrupt device and the CID gasket, whereby it is possible to prevent the CID gasket from rupturing or being detached from the current interrupt device.

Also, in a concrete example according to the present invention, an insulative coating layer, sequentially coated with an acrylic-based resin, a silicon-based resin, and a polyurethane resin, may be formed on the outer circumferential part of the current interrupt device.

Since the acrylic-based resin, the silicon-based resin, and the polyurethane resin exhibit high electrical insulation properties, the acrylic-based resin, the silicon-based resin, and the polyurethane resin may be used as the materials constituting the insulative coating layer according to the present invention. Furthermore, the acrylic-based resin exhibits high weather resistance, corrosion resistance, adhesiveness, chemical resistance, and thermal resistance, the silicon-based resin exhibits high durability and fouling resistance, and the polyurethane resin exhibits high wear resistance, processability, water resistance, and chemical resistance. In the case in which these resins are sequentially applied to the outer circumferential part of the current interrupt device to form an insulative coating layer consisting of a plurality of materials, therefore, the insulative coating layer is stably maintained even when the cylindrical secondary battery is used for a long period of time. Even when the current interrupt device comes into contact with the battery can due to the wear of the CID gasket, therefore, it is possible to prevent the occurrence of a short circuit in the battery. In addition, even when external impact or pressure is applied to the battery, the insulative coating layer serves to absorb or disperse a portion of the impact or the pressure. Consequently, it is possible to further prevent the CID gasket from being separated or detached from the current interrupt device and from rupturing, whereby it is possible to improve the safety of the secondary battery.

Meanwhile, in the cap assembly according to the present invention, the width of the insulative coating layer may range from 0.2 mm to 2 mm. If the width of the insulative coating layer is less than 0.2 mm, the insulative coating layer may be worn and thus lost after the cylindrical secondary battery is used for a long period of time, whereby the CID gasket may be easily separated from the current interrupt device when external impact is applied to the battery, which is undesirable. On the other hand, if the width of the insulative coating layer is greater than 2 mm, the thickness of the CID gasket may be reduced, and the size of the through-holes or the opening formed in the main body of the current interrupt device may be reduced. As a result, the resistance of the battery to external impact may be reduced, and the amount of gas that is discharged from the battery may be reduced, which is undesirable.

Meanwhile, in a concrete example according to the present invention, a circular or oval embossed structure may be formed on the outer circumferential part of the current interrupt device and on the inner surface of the CID gasket, which contacts the outer circumferential part of the current interrupt device, and the embossed structure may have an outer diameter of 50 μm to 500 μm.

In the case in which the embossed structure is formed as described above, the adhesiveness between the CID gasket and the current interrupt device is improved, whereby it is possible to further prevent the CID gasket from being separated or detached from the current interrupt device. In addition, external impacts are dispersed by the embossed structure, whereby it is possible to prevent the CID gasket from rupturing.

If the outer diameter of the embossed structure is less than 50 μm or is greater than 500 μm, however, the desired effects described above cannot be achieved, which is undesirable.

Meanwhile, in the present invention, the CID gasket may be made of a polymer material that is heat-fusible. Specifically, the CID gasket may be made of a thermoplastic polymer resin or a thermosetting polymer resin that can be hardened by heat.

The thermoplastic polymer resin is not particularly restricted as long as the thermoplastic polymer resin is a polymer resin that is well known in the art to which the present invention pertains. Specifically, the thermoplastic polymer resin may be one or more selected from the group consisting of polyethylene, polypropylene (PP), polypropylene-maleic anhydride (PP-MAH), thermoplastic polyester elastomer (TPEE), tetrafluoride-perfluoro alkyl vinyl ether copolymer (PFA), and polybutylene terephthalate (PBT). More specifically, the thermoplastic polymer resin may be polypropylene-maleic anhydride (PP-MAH).

Polypropylene-maleic anhydride (PP-MAH) can strongly thermally adhere to a metal material. Consequently, it is possible to easily constitute a current interrupt device assembly through the use of polypropylene-maleic anhydride (PP-MAH).

The thermosetting polymer resin may be, but is not limited to, one or more selected from among polyimide, a phenol resin, a polyester resin, and a polyurethane resin.

Meanwhile, the current interrupt device and the CID gasket may be coupled to each other via an adhesive at the interface therebetween. The adhesive may be made of an ultraviolet (UV) curable material, which may be cured by ultraviolet rays to couple the CID gasket and the current interrupt device to each other at the interface therebetween.

In the case in which ultraviolet rays are applied to a UV curable material, it is possible to cure the UV curable material without directly applying heat thereto. In addition, the UV curable material can be cured within a short period of time, whereby productivity is improved.

In the case in which the current interrupt device and the CID gasket are coupled to each other via a UV curable material functioning as an electrically insulative adhesive at the interface therebetween in consideration of the above properties, it is possible to achieve secure coupling between the current interrupt device and the CID gasket.

For example, the UV curable material may be a material having a hydrophilic function group. In the case in which a UV curable material having a hydrophilic function group is used, the current interrupt device and the CID gasket are securely coupled to each other via the UV curable material at the interface therebetween, and moisture introduced into the battery is collected by the UV curable material, whereby it is possible to improve the strength of a seal and to prevent the permeation of water into the battery.

In addition, the UV curable material may be a material that is cross-linked through chemical reaction and that provides strong coupling force between molecules. The UV curable material may be, but is not limited to, an unsaturated polyester-based resin or a polyacrylate-based resin, such as polyester acrylate, epoxy acrylate, or urethane acrylate.

Depending on the circumstances, a circular double-sided tape having a circular hole of a predetermined radius formed in the center thereof or a mobile amorphous adhesive configured to be applied in a circular form, specifically a circular double-sided tape, may be attached to the CID gasket and the current interrupt device at the interface therebetween. The double-sided tape is formed by applying a material having an adhesive property to opposite surfaces of a planar substrate. The substrate of the double-sided tape may be a silicon resin.

In accordance with another aspect of the present invention, there is provided a cylindrical secondary battery including the cap assembly. The cylindrical secondary battery is configured such that an electrode assembly, having a structure in which a positive electrode, a separator, and a negative electrode are wound in the state of being sequentially stacked, is received in a cylindrical metal battery can together with an electrolytic solution and such that the cap assembly is loaded on an open upper end of the metal battery can in a sealed state.

The kind of the secondary battery according to the present invention is not particularly restricted. In a concrete example, the secondary battery may be a lithium secondary battery, such as a lithium ion (Li-ion) secondary battery, a lithium polymer (Li-polymer) secondary battery, or a lithium ion polymer (Li-ion polymer) secondary battery, which exhibits high energy density, discharge voltage, and output stability.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and/or a positive electrode current collecting extension and drying the mixture. A filler may be further added to the mixture as needed.

In general, the positive electrode current collector and/or the positive electrode current collecting extension has a thickness of 3 to 500 µm. The positive electrode current collector and/or the positive electrode current collecting extension is not particularly restricted as long as the positive electrode current collector and/or the positive electrode current collecting extension exhibits high conductivity while the positive electrode current collector and/or the positive electrode current collecting extension does not induce any chemical change in a battery to which the positive electrode current collector and/or the positive electrode current collecting extension is applied. For example, the positive electrode current collector and/or the positive electrode current collecting extension may be made of stainless steel, aluminum, nickel, titanium, or plastic carbon. Alternatively, the positive electrode current collector and/or the positive electrode current collecting extension may be made of aluminum or stainless steel, the surface of which is treated with carbon, nickel, titanium, or silver. In addition, the positive electrode current collector and/or the positive electrode current collecting extension may have a micro-scale uneven pattern formed at the surface thereof so as to increase the adhesive force of the positive electrode active material. The positive electrode current collector and/or the positive electrode current collecting extension may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or conductive materials, such as polyphenylene derivatives may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode active material to a negative electrode current collector and/or a negative electrode current collecting extension and drying the same. The above-described components may be selectively added to the negative electrode active material as needed.

In general, the negative electrode current collector and/or the negative electrode current collecting extension has a thickness of 3 to 500 μm. The negative electrode current collector and/or the negative electrode current collecting extension is not particularly restricted so long as the negative electrode current collector and/or the negative electrode current collecting extension exhibits high conductivity and the negative electrode current collector and/or the negative electrode current collecting extension does not induce any chemical change in a battery to which the negative electrode current collector and/or the negative electrode current collecting extension is applied. For example, the negative electrode current collector and/or the negative electrode current collecting extension may be made of copper, stainless steel, aluminum, nickel, titanium, or plastic carbon. Alternatively, the negative electrode current collector and/or the negative electrode current collecting extension may be made of copper or stainless steel, the surface of which is treated with carbon, nickel, titanium, or silver, or an aluminum-cadmium alloy. In addition, the negative electrode current collector and/or the negative electrode current collecting extension may have a micro-scale uneven pattern formed on the surface thereof so as to increase the adhesive force of the negative electrode active material, in the same manner as the positive electrode current collector and/or the positive electrode current collecting extension. The negative electrode current collector and/or the negative electrode current collecting extension may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrolytic solution may be a non-aqueous electrolytic solution containing lithium salt, which is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas. Moreover, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of a cyclic carbonate, such as EC or PC, which is a high dielectric solvent, and a linear carbonate, such as DEC, DMC, or EMC, which is a low viscosity solvent, to prepare a non-aqueous electrolyte containing lithium salt.

Advantageous Effects

As is apparent from the above description, in the cap assembly according to the present invention, the insulative coating layer is formed on the outer circumferential part of the current interrupt device. Consequently, it is possible to prevent the CID gasket from being separated or detached from the current interrupt device or from rupturing. Even when the CID gasket is separated or detached from the current interrupt device or the CID gasket ruptures and thus the current interrupt device comes into contact with the battery can, it is possible to prevent the occurrence of a short circuit in the battery, thereby greatly improving the safety of the battery.

BRIEF DESCRIPTION OF DRAWINGS

The above and other objects, features and other advantages of the present invention will be more clearly understood from the following detailed description taken in conjunction with the accompanying drawings, in which:

FIG. 1 is a vertical sectional view showing a cap assembly of a conventional cylindrical secondary battery;

FIG. 2 is a perspective view of a current interrupt device included in a cap assembly according to the present invention;

FIG. 3 is a perspective view showing an insulative coating layer formed on an outer circumferential part of the current interrupt device according to the present invention;

FIG. 4 is a perspective view of a current interrupt device according to the present invention;

FIG. 5 is a perspective view showing an insulative coating layer formed on the outer circumferential part of the current interrupt device according to the present invention;

FIG. 6 is a perspective view showing different insulative coating layers formed on the outer circumferential surface, the upper surface, and the lower surface of the current interrupt device according to the present invention;

FIG. 7 is a vertical sectional view of FIG. 6;

FIG. 8 is a vertical sectional view showing different insulative coating layers sequentially stacked on the outer circumferential part of the current interrupt device according to the present invention;

FIG. 9 is a schematic view showing a current interrupt device (CID) gasket and the current interrupt device according to the present invention;

FIG. 10 is a schematic view showing the CID gasket and the current interrupt device according to the present invention, coupled to each other via an adhesive at the interface therebetween;

FIG. 11 is a schematic view showing an embossed structure formed on one surface of the CID gasket and on the outer circumferential part of the current interrupt device according to the present invention;

FIG. 12 is a photograph showing the external shape of a cylindrical secondary battery after a crush test has been performed on the cylindrical secondary battery;

FIG. 13 is a vertical sectional CT photograph showing the internal shape of the cylindrical secondary battery after the crush test has been performed on the cylindrical secondary battery; and FIG. 14 is a photograph showing the shape of the CID gasket after the crush test has been performed on the cylindrical secondary battery.

DETAILED DESCRIPTION OF THE INVENTION

Now, exemplary embodiments of the present invention will be described in detail with reference to the accompanying drawings. It should be noted, however, that the illustrated embodiments are given for easier understanding of the present invention and thus the scope of the present invention is not limited by the illustrated embodiments.

FIG. 2 is a perspective view of a current interrupt device included in a cap assembly according to the present invention, and FIG. 3 is a perspective view showing an insulative coating layer formed on an outer circumferential part of the current interrupt device according to the present invention. Here, the outer circumferential part of the current interrupt device, denoted by reference numeral 110, includes the outer circumferential surface 133 of the current interrupt device and portions of the upper surface 111 and the lower surface 112 of the current interrupt device that are adjacent to the outer circumferential surface 133 of the current interrupt device.

Referring to FIGS. 2 and 3, the current interrupt device includes a main body 116 formed in the planar shape of a circle, the main body 116 being provided therein with six openings 116a, 116b, 116c, 116d, 116e, and 116f, and a rupture part 117 formed at the center of the main body 116 so as to be ruptured by the pressure of gas. An insulative coating layer 200, which is made of an electrically insulative material, is formed on the outer circumferential part 110 of the current interrupt device. Even when the current interrupt device comes into contact with a battery can due to the separation, detachment, or rupture of a CID gasket, therefore, it is possible to prevent the occurrence of a short circuit in a battery.

FIG. 4 is a perspective view of a current interrupt device according to the present invention, and FIG. 5 is a perspective view showing an insulative coating layer formed on the outer circumferential part of the current interrupt device according to the present invention.

Referring to FIGS. 4 and 5, the current interrupt device includes a main body 216 formed in the planar shape of a circle, the main body 216 being provided therein with three openings 216a, 216b, and 216c, and a rupture part 217 formed at the center of the main body 216 so as to be ruptured by the pressure of gas.

The rupture part 217, formed at the center of the main body 216 of the current interrupt device, protrudes upward so as to be connected to the lower end of a safety vent. Three through-holes 218a, 218b, and 218c are formed along a circle having the rupture part 217 as the center.

The openings 216a, 216b, and 216c are formed such that the sum of the areas of the openings 216a, 216b, and 216c is equivalent to 30% the area of the current interrupt device. The amount of high-pressure gas that is discharged from a battery is increased through the openings, whereby the current interrupt effect is reliably achieved.

The openings 216a, 216b, and 216c are spaced apart from each other by about 120 degrees. The openings 216a, 216b, and 216c have the same shape and the same size. The openings 216a, 216b, and 216c are arranged at the same interval. In this structure, therefore, the mechanical strength of the current interrupt device is maintained high while the amount of gas that is discharged from the battery is maximized. In particular, an insulative coating layer 200, which is made of an electrically insulative material, is formed on the outer circumferential part 110 of the current interrupt device according to the present invention.

FIG. 6 is a perspective view showing different insulative coating layers formed on the outer circumferential surface, the upper surface, and the lower surface of the current interrupt device according to the present invention, and FIG. 7 is a vertical sectional view of FIG. 6.

Referring to FIGS. 6 and 7, in a concrete example of the present invention, an insulative coating layer coated with a reinforced polyurethane resin 200a is formed on the outer circumferential surface 133 of the current interrupt device 15, and an insulative coating layer coated with a silicon-based resin 200b is formed on portions of the upper surface 111 and the lower surface 112 of the current interrupt device 15 that are adjacent to the outer circumferential surface 133 of the current interrupt device 15.

FIG. 8 is a vertical sectional view showing different insulative coating layers sequentially stacked on the outer circumferential part of the current interrupt device according to the present invention.

Referring to FIG. 8 together with FIG. 7, an insulative coating layer 200, sequentially coated with an acrylic-based resin 230, a silicon-based resin 220, and a polyurethane resin 210, is formed on the outer circumferential part 110 of the current interrupt device 15.

FIG. 9 is a schematic view showing a CID gasket and the current interrupt device according to the present invention, FIG. 10 is a schematic view showing the CID gasket and the current interrupt device according to the present invention, coupled to each other via an adhesive at the interface therebetween, and FIG. 11 is a schematic view showing an embossed structure formed on one surface of the CID gasket and on the outer circumferential part of the current interrupt device according to the present invention.

Referring to FIGS. 9 to 11, the CID gasket, denoted by reference numeral 14, is coupled to the current interrupt device 15 along the outer circumferential part 110 of the current interrupt device 15 in order to secure the electrical insulation property of the current interrupt device 15. In general, the CID gasket 14 and the current interrupt device 15 are coupled to each other by thermal fusion. The insulative coating layer 200, which is provided to secure the electrical insulation property of the current interrupt device 15, is formed on the outer circumferential part 110 of the current interrupt device 15 according to the present invention. In addition to the thermal fusion, an adhesive 60 is applied to the outer circumferential part 110 of the current interrupt device 15 in order to achieve coupling between the CID gasket 14 and the current interrupt device 15.

Also, in a concrete example, an embossed structure 70 is formed on the outer circumferential part 110 of the current interrupt device 15 and on the inner surface of the CID gasket 14, which contacts the outer circumferential part 110 of the current interrupt device 15.

Meanwhile, FIG. 12 is a photograph showing the external shape of a cylindrical secondary battery after a crush test has been performed on the cylindrical secondary battery, FIG. 13 is a vertical sectional CT photograph showing the internal shape of the cylindrical secondary battery after the crush test has been performed on the cylindrical secondary battery, and FIG. 14 is a photograph showing the shape of the CID gasket after the crush test has been performed on the cylindrical secondary battery.

Referring to FIGS. 12 to 14, there is shown the shape of a cylindrical secondary battery after a crush test has been performed on the cylindrical secondary battery. The crush test is a safety test that simulates the state of a secondary battery when the secondary battery is crushed by pressure. In the crush test, the secondary battery is pressurized at a speed of 3 mm/min and a force of 13 kN in the state in which the secondary battery is disposed between two iron plates in order to determine whether the secondary battery catches fire.

Referring to FIG. 12, it can be seen that a cylindrical secondary battery is crushed and deformed after the crush test has been performed on the cylindrical secondary battery. Specifically, it can be seen that a cylindrical battery can 20 and a cap assembly 10 are deformed and damaged. A change in the shape of the cylindrical battery can 20 and the cap assembly 10 may cause the occurrence of a short circuit in the secondary battery. In addition, a CID gasket 14 included in the cap assembly 10 may be separated or detached from the current interrupt device 15 or may rupture, whereby the CID gasket 14 may malfunction.

Referring to FIG. 13, the inner shape of the cylindrical secondary battery is observed through CT analysis after the crush test is performed on the cylindrical secondary battery. As a result, it can be seen from some samples of the cylindrical secondary battery that the CID gasket 14 has been separated or detached from the current interrupt device 15 in the cap assembly 10 and thus the current interrupt device 15 has come into contact with the battery can 20, whereby a short circuit occur in the secondary battery.

Referring to FIG. 14, a portion of the cylindrical secondary battery, on which the crush test was performed, at which a short circuit occurred has been disassembled in order to observe the shape of the CID gasket 14. As a result, the CID gasket 14 is seen to be deformed or ruptured. Consequently, it can be seen that the CID gasket 14 was unable to prevent contact between the battery can 20 and the current interrupt device 15 in the cap assembly 10, whereby a short circuit has occurred in the secondary battery. For this reason, there is a necessity for technology that is capable of preventing the occurrence of a short circuit due to the current interrupt device 15, thereby improving the safety of the secondary battery. In the cap assembly 10 according to the present invention, the insulative coating layer 200, which is made of an electrically insulative material, is formed on the outer circumferential part 110 of the current interrupt device 15 in order to prevent the occurrence of a short circuit in the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cap assembly loaded on an open upper end of a metal battery can of a cylindrical secondary battery, the cap assembly comprising:
   a top cap at an uppermost end of the cap assembly and including a positive electrode terminal having an outward protruding structure;
   a safety vent under the top cap and electrically connected to the top cap via a safety vent for discharging gas;
   a current interrupt device configured such that a portion of an upper surface of the current interrupt device is connected to the safety vent and a portion of a lower surface of the current interrupt device is connected to an electrode lead of an electrode assembly, the portion of the current interrupt device connected to the safety vent being configured to rupture when high pressure is generated in the battery, whereby the current interrupt device is separated from the safety vent to interrupt a flow of current;
   a current interrupt device (CID) gasket coupled to the current interrupt device so as to wrap an outer circumferential part of the current interrupt device excluding portions of the current interrupt device that are connected to electrode tabs and the safety vent to secure an electrical insulation property of the current interrupt device; and, an insulative coating layer of an electrically insulative material on the outer circumferential part of the current interrupt device, and wherein the insulative coating layer is continuously formed on an outer circumferential surface of the current interrupt device and on portions of an upper surface and a lower surface of the current interrupt device that are adjacent to the outer circumferential surface of the current interrupt device, and wherein the insulative coating layer is absent at a center of the upper and lower surfaces of the current interrupt.

2. The cap assembly according to claim 1, wherein the current interrupt device comprises:

a main body having a planar shape of a circle, the main body being provided therein with a plurality of openings; and a rupture part at a center of the main body so as to be ruptured by an increasing pressure of gas in the battery can, the rupture part being coupled to a lower end of the safety vent.

3. The cap assembly according to claim 1, wherein the insulative coating layer formed on the portions of the upper surface and the lower surface of the current interrupt device has a width of 0.2 mm to 1 mm.

4. The cap assembly according to claim 1, wherein the electrically insulative material is any one selected from a group consisting of polypropylene, polybutylene terephthalate (PBT), a polyacetate-based resin, a rubber resin, a nylon-based resin, a polylacton-based resin, chitosan, polyvinyl alcohol, fibrinogen, polysulfone, a polyurethane resin, a silicon-based resin, an acrylic-based resin, an epoxy-based resin, and an imide-based resin.

5. The cap assembly according to claim 1, wherein the electrically insulative material is a polyurethane resin.

6. The cap assembly according to claim 1, wherein the insulative coating layer coated includes a reinforced polyurethane resin is formed on the outer circumferential surface of the current interrupt device.

7. The cap assembly according to claim 1, wherein insulative coating layer coated includes a reinforced polyurethane resin on outer circumferential surface of the current interrupt device, and a silicon-based resin on portions of an upper surface and a lower surface of the current interrupt device that are adjacent to the outer circumferential surface of the current interrupt device.

8. The cap assembly according to claim 1, wherein insulative coating layer is sequentially coated with an acrylic-based resin, a silicon-based resin, and a polyurethane resin on the outer circumferential part of the current interrupt device.

9. The cap assembly according to claim 1, wherein insulative coating layer has a width of 0.2 mm to 2 mm.

10. The cap assembly according to claim 1, wherein a circular or oval embossed structure is formed on the outer circumferential part of the current interrupt device and on an inner surface of the CID gasket, which contacts the outer circumferential part of the current interrupt device.

11. The cap assembly according to claim 10, wherein the embossed structure has an outer diameter of 50 µm to 500 µm.

12. The cap assembly according to claim 1, wherein the current interrupt device and the CID gasket are coupled to each other via an adhesive at an interface therebetween.

13. The cap assembly according to claim 12, wherein the adhesive is made of an ultraviolet (UV) curable material, which is cured by ultraviolet rays to couple the CID gasket and the current interrupt device to each other at the interface therebetween.

14. The cap assembly according to claim 13, wherein the UV curable material is an unsaturated polyester-based resin or a polyacrylate-based resin.

15. A cylindrical secondary battery configured such that an electrode assembly, having a structure in which a positive electrode, a separator, and a negative electrode are wound in a state of being sequentially stacked, is received in a cylindrical metal battery can together with an electrolytic solution and such that the cap assembly according to claim 1 is loaded on an open upper end of the metal battery can in a sealed state.

16. The cap assembly according to claim 2, wherein insulative coating layer absent at the center of the upper and lower surfaces of the current interrupt having the plurality of openings and the rupture part.

17. The cap assembly according to claim 1, wherein insulative coating layer includes:

a reinforced polyurethane resin on the outer circumferential surface of the current interrupt device; and a silicon-based resin on the portions of the upper and lower surfaces of the current interrupt device that are adjacent to the outer circumferential surface of the current interrupt device.

* * * * *